(12) United States Patent
Sato

(10) Patent No.: US 11,138,149 B2
(45) Date of Patent: Oct. 5, 2021

(54) INFORMATION PROCESSING SYSTEM, CONTROL METHOD THEREFOR, AND STORAGE MEDIUM FOR HANDLING AN ERROR IN CONVERTING DATA IN A PROCESS FOR GENERATING BUSINESS FORM DATA

(71) Applicant: CANON KABUSHIKI KAISHA, Tokyo (JP)

(72) Inventor: Yuichiro Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 371 days.

(21) Appl. No.: 16/208,310

(22) Filed: Dec. 3, 2018

(65) Prior Publication Data

US 2019/0179800 A1 Jun. 13, 2019

(30) Foreign Application Priority Data

Dec. 12, 2017 (JP) .............................. JP2017-238087

(51) Int. Cl.
```
G06F 16/00       (2019.01)
G06F 16/11       (2019.01)
G06F 11/30       (2006.01)
G06F 16/51       (2019.01)
G06F 16/957      (2019.01)
G06F 16/84       (2019.01)
G06F 17/00       (2019.01)
```
(52) U.S. Cl.
CPC ........ G06F 16/116 (2019.01); G06F 11/3068 (2013.01); G06F 16/51 (2019.01); G06F 16/84 (2019.01); G06F 16/9574 (2019.01); G06F 16/9577 (2019.01)

(58) Field of Classification Search
None
See application file for complete search history.

(56) References Cited

U.S. PATENT DOCUMENTS

| 6,332,139 | B1 * | 12/2001 | Kaneko | H04L 29/06027 |
| 6,829,746 | B1 * | 12/2004 | Schwerdtfeger | G06F 16/9577 |
| | | | | 715/239 |
| 7,461,353 | B2 * | 12/2008 | Rohrabaugh | G06F 16/986 |
| 7,627,648 | B1 * | 12/2009 | Mehta | G06F 16/9577 |
| | | | | 709/217 |
| 8,145,995 | B2 * | 3/2012 | Rohrabaugh | G06F 16/986 |
| | | | | 715/249 |

(Continued)

FOREIGN PATENT DOCUMENTS

| JP | 2016115050 A | 6/2016 | |
| WO | 02/10905 | * 2/2002 | ............... G06F 9/00 |

OTHER PUBLICATIONS

Julius C. Mong and David F. Brailsford "Using SVG as the Rendering Model for Structured and Graphically Complex Web Material", 2003, ACM Symposium on Document Engineering (Year: 2003).*

*Primary Examiner* — Polina G Peach
(74) *Attorney, Agent, or Firm* — Canon U.S.A., Inc. I.P. Division

(57) ABSTRACT

According to one embodiment, an information processing system is provided in which a web browser includes a re-display unit that acquires second image data based on information about an acquisition destination of a second conversion index file transmitted by a transmission unit, and displays the acquired second image data.

10 Claims, 10 Drawing Sheets

(56) References Cited

U.S. PATENT DOCUMENTS

| | | | | |
|---|---|---|---|---|
| 8,176,321 B1* | 5/2012 | Perry | .................. | H04L 67/2819 |
| | | | | 713/167 |
| 2002/0143794 A1* | 10/2002 | Helt | ...................... | G06F 16/116 |
| 2006/0059462 A1* | 3/2006 | Yamamoto | ............ | G03G 15/5079 |
| | | | | 717/115 |
| 2010/0223467 A1* | 9/2010 | Dismore | ................ | G06Q 10/10 |
| | | | | 713/168 |
| 2012/0242689 A1* | 9/2012 | Miyata | ...................... | G06F 3/14 |
| | | | | 345/629 |
| 2012/0254204 A1* | 10/2012 | Pryor-Miller | ........... | G06F 40/58 |
| | | | | 707/756 |
| 2013/0198600 A1* | 8/2013 | Lockhart | ............... | G06F 40/169 |
| | | | | 715/230 |
| 2014/0355059 A1* | 12/2014 | Asai | ...................... | G06F 3/1212 |
| | | | | 358/1.15 |
| 2015/0135214 A1* | 5/2015 | Reisman | ............ | H04N 21/4113 |
| | | | | 725/37 |
| 2016/0104300 A1* | 4/2016 | Sakurai | ...................... | G06T 9/00 |
| | | | | 382/239 |
| 2016/0259630 A1* | 9/2016 | Roos | ......................... | G06F 8/35 |
| 2017/0163635 A1* | 6/2017 | Hirata | ................. | H04L 63/0853 |
| 2018/0101525 A1* | 4/2018 | Hirata | .................. | G06F 16/958 |
| 2018/0121066 A1* | 5/2018 | Kato | .................. | G06F 3/04845 |
| 2018/0131470 A1* | 5/2018 | Padmanabhan | ......... | G06F 3/067 |
| 2018/0196857 A1* | 7/2018 | Silverstein | ............ | G06F 16/972 |

* cited by examiner

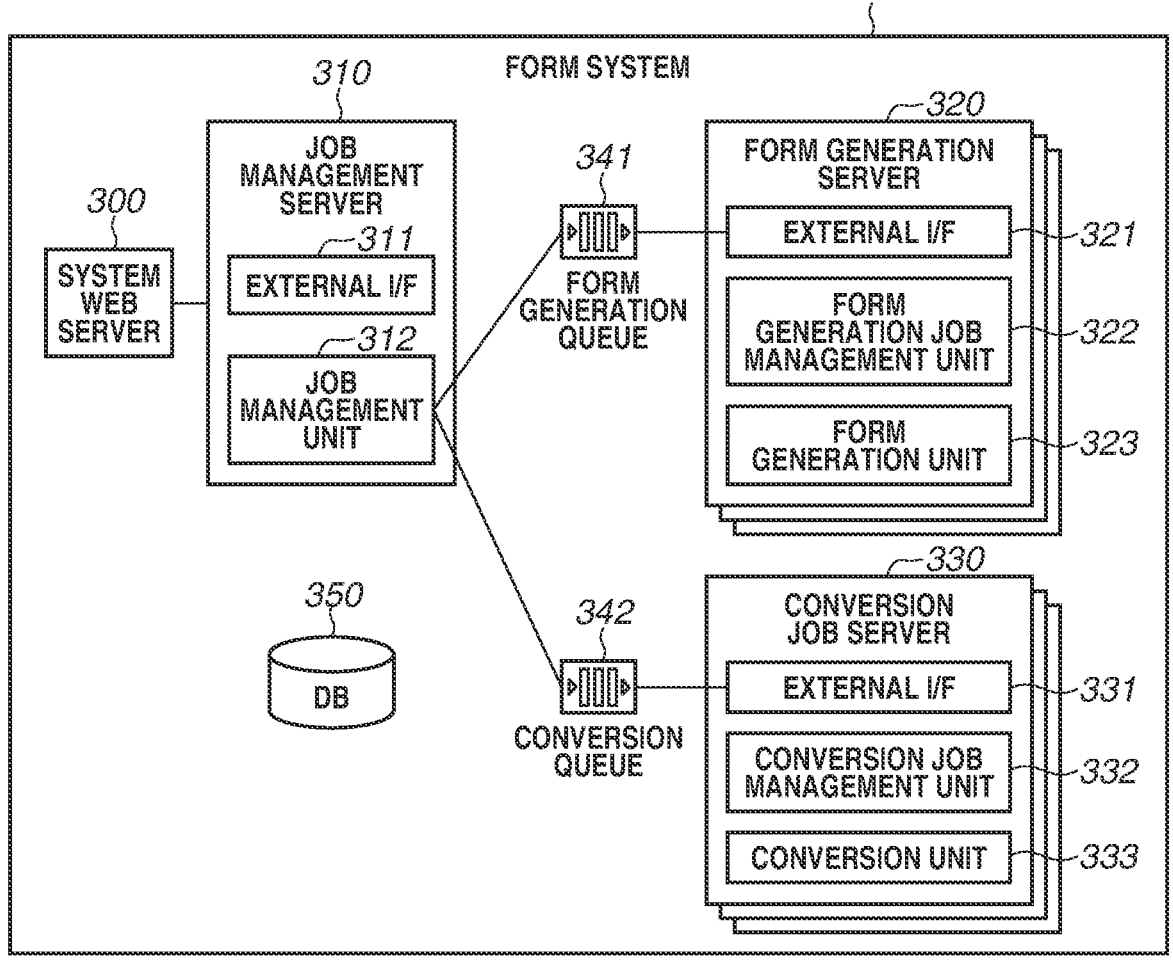
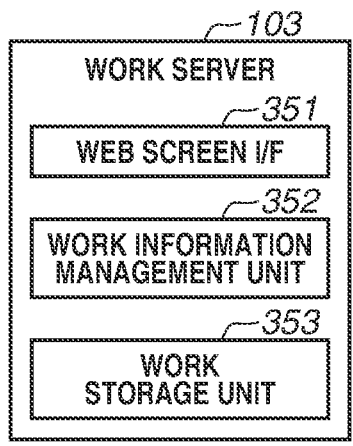
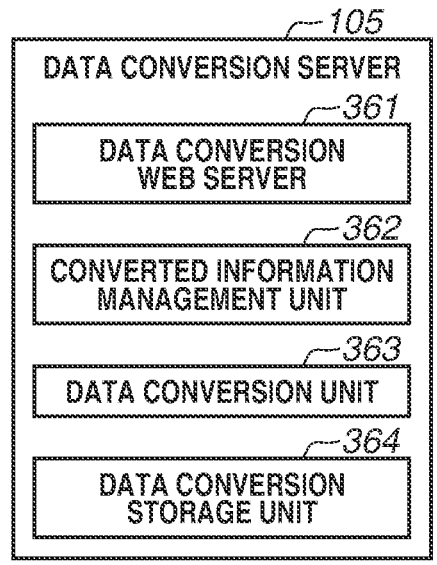
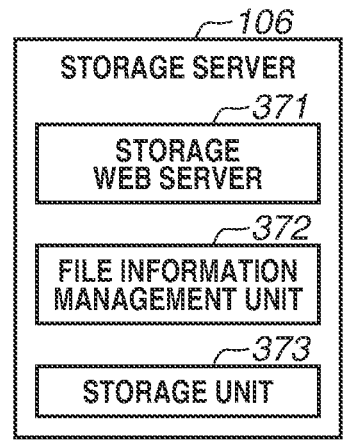

FIG.4

```
{
  "dataList": [
    "https://storage.com/form/overlay-111/pdf/data-1.pdf",
    "https://storage.com/form/overlay-111/pdf/data-2.pdf"
  ],
  "end": false
}
```

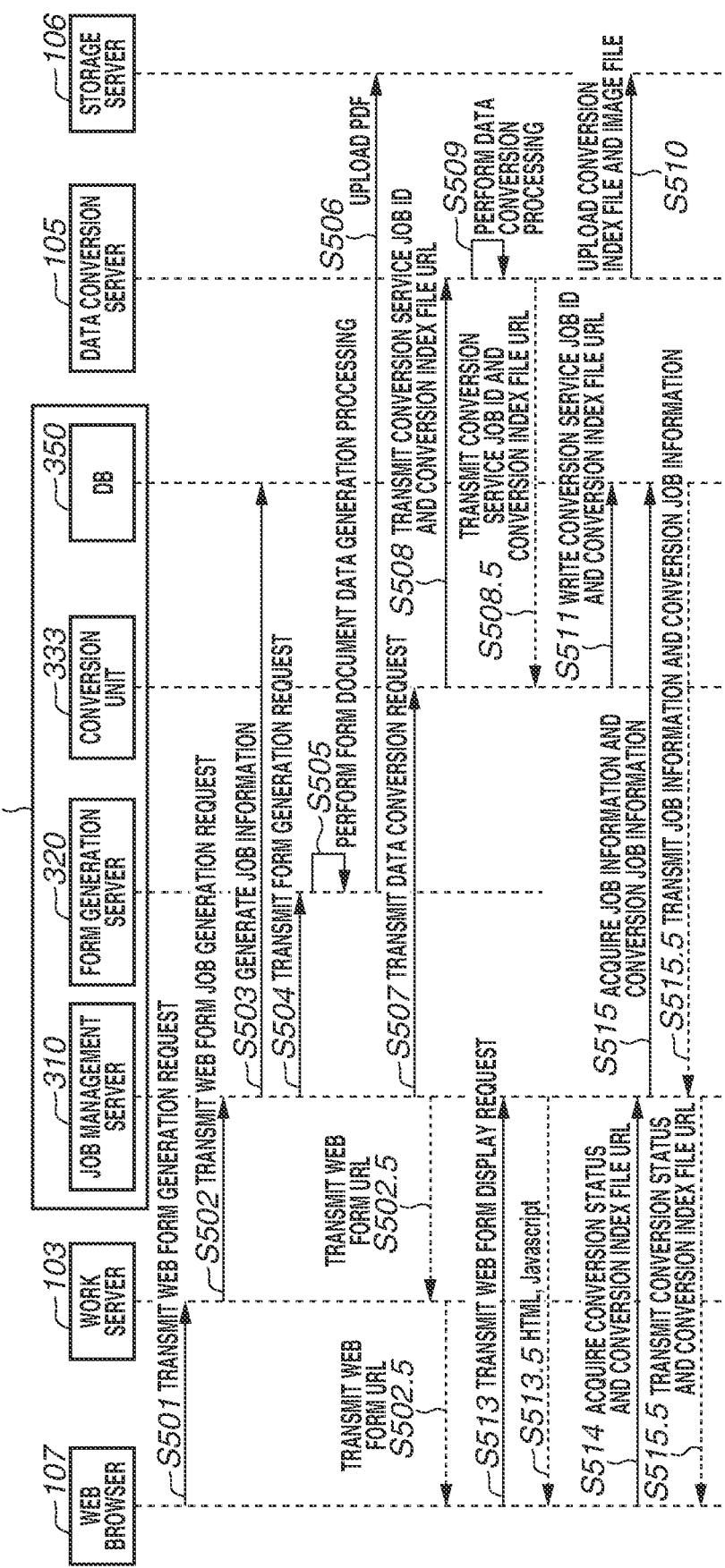

FIG.6

```
{
  "jobId": "00001",
  "initialView": "svg",
  "svg": {
    "status": "PROCESSING"
    "indexUrl": "https://storage.com/conv/xxxxx/index.json"
  },
  "thumbnail": {
    "status": "SUCCESS"
    "indexUrl": "https://storage.com/conv/yyyyy/index.json"
  }
}
```

600

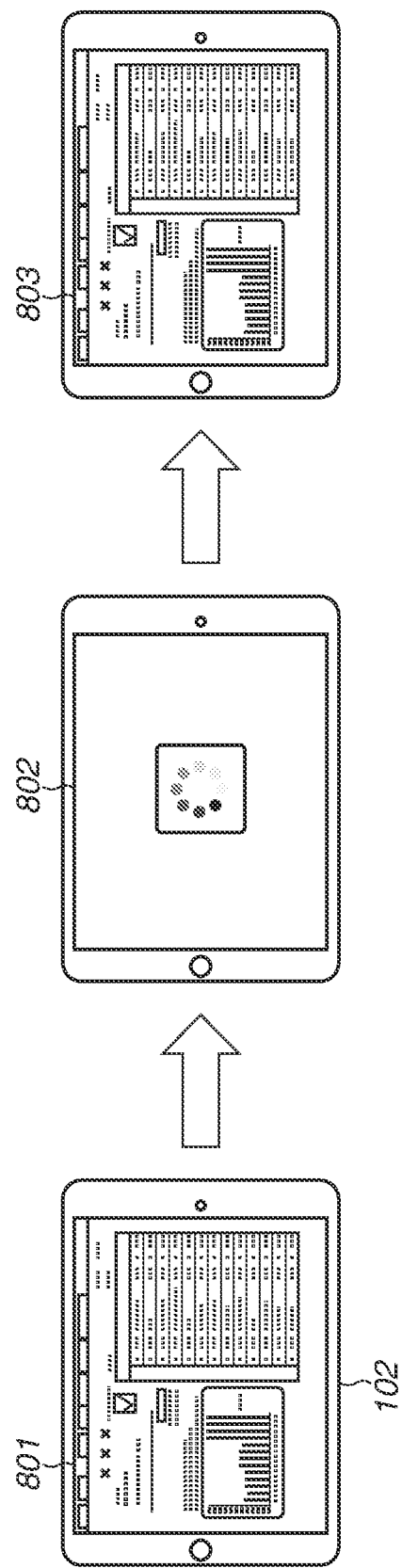

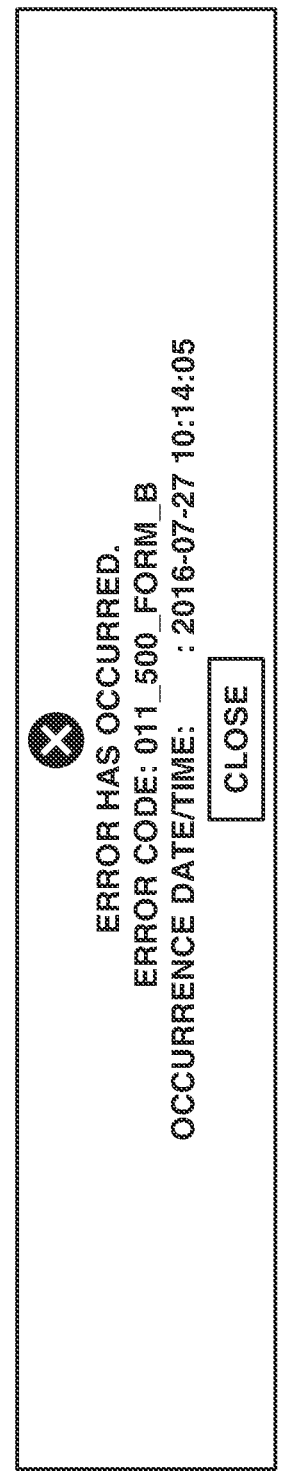

INFORMATION PROCESSING SYSTEM, CONTROL METHOD THEREFOR, AND STORAGE MEDIUM FOR HANDLING AN ERROR IN CONVERTING DATA IN A PROCESS FOR GENERATING BUSINESS FORM DATA

BACKGROUND OF THE INVENTION

Field of the Invention

The present disclosure relates to an information processing system that generates business form data, and a control method and a program therefor.

Description of the Related Art

There is an information processing configuration in which a user accesses a web browser of cloud services via the Internet from a client web browser to browse digitized form data on the web browser. There is another configuration in which the business form data being browsed according to a workflow is edited and printed.

In the case of handling the business form data on a web browser, a Scalable Vector Graphics (SVG) format which has a high compatibility with a web browser, a web application server, and a HyperText Transfer Protocol (HTTP) is used instead of Portable Document Format (PDF) data which is generally used in a business form system. The use of the SVG format makes it possible to realize a dynamic expression, which is difficult to realize with PDF format data, and to realize browsing of a value-added web form data which does not deteriorate when a screen is enlarged or reduced.

To acquire the business form data in SVG format, it is necessary to generate PDF format data and convert the data into an SVG format. In this case, there is a configuration in which business form data generated on a form server is converted, as needed, into an SVG format on a conversion server so as to shorten the time required for browsing the business form data on a web browser after the business form data is created.

Business form data generation processing and conversion processing for converting the business form data into an SVG format (hereinafter referred to as SVG conversion processing) are executed asynchronously and in parallel. In addition to the SVG conversion processing, image conversion processing for converting an image into a Joint Photographic Experts Group (JPEG) format (hereinafter referred to as JPEG conversion processing) is also executed asynchronously and in parallel. An image in JPEG format is used in a thumbnail format for displaying a list of form documents which include a plurality of pages.

An index file including a URL as information about an acquisition destination of an image file for displaying the image file on a web browser is downloaded to the web browser, and the index file is referenced by a web application, so that the image file can be downloaded. In this case, in the conversion server, the SVG conversion processing goes on, and every time the image file is generated, a URL for the image file is added and the index file is updated. Japanese Patent Application Laid-Open No. 2016-115050 discusses an information processing system in which an index file is overwritten with reference information about a newly processed file when the newly processed file is created.

SUMMARY OF THE INVENTION

According to various embodiments of the present disclosure, an information processing system includes a performance unit configured to perform conversion processing, a first time, to sequentially generate business form data based on data, a creation unit configured to create a first conversion index file including information about an acquisition destination of generated first image data, a displaying unit configured to display the first image data based on the created first conversion index file, an execution unit configured to execute the conversion processing in the generating, a second time, to create a second conversion index file in a case where it is determined that an error has occurred in the conversion processing the first time, a transmission unit configured to transmit, to a client web browser configured to display image data, information about an acquisition destination of the second conversion index file, an acquiring unit configured to acquire second image data based on the information about the acquisition destination of the second conversion index file, and a displaying unit configured to display the acquired second image data.

Further features will become apparent from the following description of exemplary embodiments with reference to the attached drawings.

BRIEF DESCRIPTION OF THE DRAWINGS

FIGS. 3A to 3D are block diagrams each illustrating functions included in the various devices.

FIG. 4 illustrates an example of an index file.

FIG. 6 illustrates an example of response information to be returned to a web browser in steps S514 and S524.

FIG. 8 illustrates an example of a display screen on a web browser according to the first exemplary embodiment.

FIG. 9 illustrates an example of a display screen on a web browser according to the second exemplary embodiment.

DESCRIPTION OF THE EMBODIMENTS

If an error has occurred during generation of business form data (Scalable Vector Graphics (SVG) data, Joint Photographic Experts Group (JPEG) data), re-execution is required. In a case where SVG conversion processing, JPEG conversion processing, and downloading of an image file on a web browser are executed asynchronously, the SVG conversion processing is executed as another job if a retry is performed. As a result, URLs for an index file and an image file are changed, so that the original URLs cannot be used. However, the web browser cannot detect that a retry is being executed by the form server, or the acquired URLs cannot be used. As a result, the web browser cannot download the image file even after a retry has been performed.

Various embodiments of the present disclosure are directed to providing a system in which a plurality of conversion processes is executed asynchronously and in parallel, and if an error has occurred in the processing, a web browser executes a retry and re-acquisition of an image file.

According to various embodiments of the present disclosure are, it is possible to provide a system in which a plurality of conversion processes is executed asynchronously and in parallel, and if an error has occurred in the processing, a web browser can execute a retry and re-acquisition of an image file.

Modes of carrying out various embodiments of the present disclosure will be described below with reference to the drawings.

<Configuration of Information Processing System>

Figure 1:
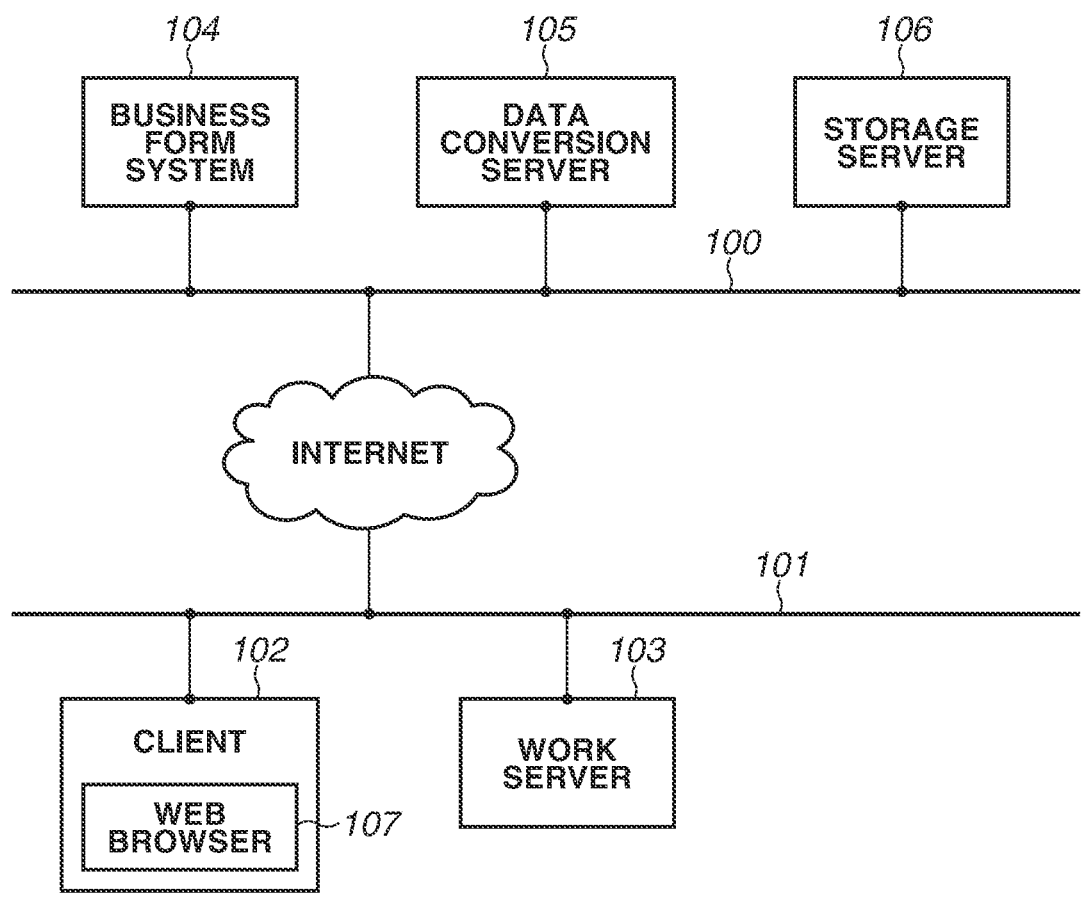
FIG. 1 is a configuration diagram illustrating an information processing system.

A first exemplary embodiment will be described below. FIG. 1 is a configuration diagram illustrating an information processing system according to one embodiment of the present disclosure. The information processing system includes a client 102, a work server 103, a business form system 104, a data conversion server 105, and a storage server 106. The client 102 is connected to a local network 101 via a wired or wireless local area network (LAN). The local network 101 is connected to an internetwork 100. The client 102 can use services provided by the business form system 104, the data conversion server 105, and the storage server 106 via the local network 101 and the internetwork 100. The client 102 specifically includes a personal computer and a mobile terminal. An environment for executing programs for a web browser 107 and the like is incorporated in the client 102.

The work server 103 is a server for managing work information. The work information is, for example, client information and stock information, and is used for creating the business form. The work server 103 provides a screen for displaying the work information in response to a request from the client 102, and for instructing generation of web business form data.

The business form system 104 receives a request from the work server 103, and generates and manages PDF format data. Further, the business form system 104 transmits, to the data conversion server 105, a request for converting the format of the generated PDF format data.

The data conversion server 105 receives, from the business form system 104, a request for converting the data format, and generates web form data in SVG format or JPEG format. The storage server 106 manages a file and uploads or downloads the file in response to a request from the client 102, the business form system 104, or the data conversion server 105.

A server computer or a group of server computers is herein referred to as a system. The server computer is referred to as a server, which is constituted by the work server 103, the business form system 104, the data conversion server 105, and the storage server 106 in FIG. 1. However, the present invention is not limited to this configuration. The functions of the work server 103, the business form system 104, the data conversion server 105, and the storage server 106 may be implemented by a plurality of servers, or may be implemented by a single server.

<Hardware Configuration>

Figure 2:
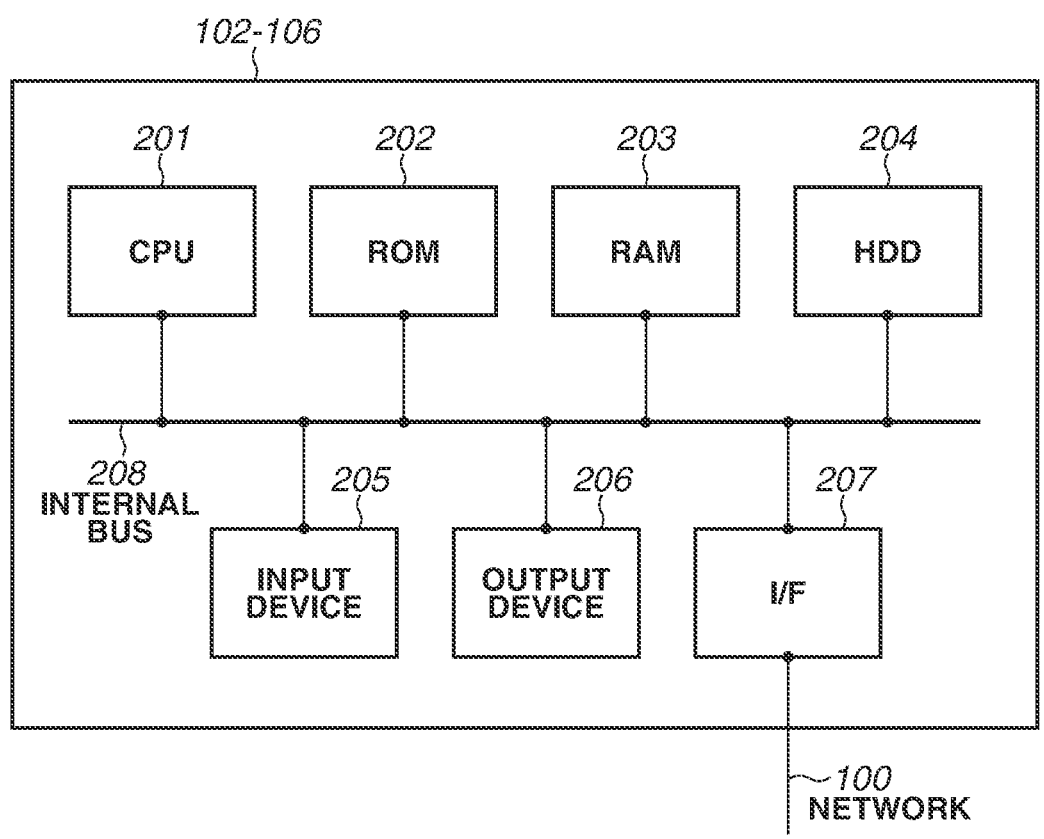
FIG. 2 is a block diagram illustrating a hardware configuration of various devices.

FIG. 2 is a block diagram illustrating a hardware configuration of the various devices 102 to 106. Internal configurations of the various devices 102 to 106 have the same basic structure. In the description of FIG. 2, a description is given using the client 102 as an example.

A central processing unit (CPU) 201 is a unit that executes programs loaded from a read-only memory (ROM) 202, a random access memory (RAM) 203, or the like, to control the client 102. A sequence diagram and a flowchart described below illustrate processing implemented by executing the programs. Further, the CPU 201 controls each block connected to an internal bus 208.

The ROM 202 is a storage device in which, for example, an embedded program including an operating system (OS) and an application program such as a basic input output system (BIOS), and data etc. are stored. The BIOS is a program for controlling peripheral devices connected to the client 102.

The RAM (direct storage device) 203 is a work memory used for the CPU 201 to execute programs. Programs stored in the ROM 202 are loaded into the RAM 203, and the programs are sequentially read and executed by the CPU 201.

A hard disk drive (HDD) 204 is an external storage device that stores an OS and software modules. The HDD 204 can be replaced by an indirect storage device such as a solid-state drive (SSD).

An input device 205 is connected to a keyboard, a pointing device, or the like (not illustrated). An output device 206 is connected to a display or the like. The input device 205 and the output device 206 are not necessarily different devises. The input device 205 and the output device 206 may be integrally configured like a touch screen display.

An interface (I/F) 207 is connected to the internetwork 100 or the local network 101. The I/F 207 inputs or outputs information to or from the client 102 through the internetwork 100.

In these pieces of hardware, the CPU 201 executes the BIOS of the ROM 202 after the client 102 is activated, and the OS and control programs stored in the HDD 204 are loaded into the RAM 203 to control the client 102 based on the loaded programs. Unless otherwise stated, hardware that executes processing on the various devices 102 to 106 is the CPU 201, and software that executes processing on the various devices 102 is an application program installed in the HDD 204.

<Software Configuration and Management Information of Work Server 103>

Referring to FIG. 3A, a web screen I/F 351, a work information management unit 352, and a work storage unit 353, which are functions included in the work server 103, will be described. Various functions are stored in the HDD 204 and are loaded into the RAM 203 and executed by the CPU 201.

The web screen I/F 351 performs a function of providing a user interface to the work server 103. The work storage unit 353 performs a function of storing work information. The web screen I/F 351 generates and provides a screen for displaying work information to be managed by the work information management unit 352 in response to a request from the web browser 107.

The work information is stored in the work storage unit 353 and is managed by the work information management unit 352. The function of the work storage unit 353 differs from the function of the work information management unit 352 in that the work storage unit 353 permanently stores work information, whereas the work information management unit 352 performs functions of change, addition, deletion, and the like of work information. Specifically, the work information management unit 352 performs processing by reading the work information from the work storage unit 353 and holding the read work information in a memory. The relationship between a management unit (362, 372) and a storage unit (364, 373), which are described below, is the same.

Alternatively, the work information may be stored in another server capable of performing communication through the internetwork 100 or the local network 101, instead of being stored in an external memory of the work server 103.

Information managed by the work information management unit 352 of the work server 103 includes client information and business form information. Table 1 illustrates an example of the client information.

TABLE 1

Client Information

| Client ID | Name | Address | Birth Date | Contact |
|---|---|---|---|---|
| 1 | Taro Chohyo | 1-2-3, B-city, A-prefecture | Jan. 1, 1989 | 090-9999-9999 |
| 2 | Hanako Chohyo | 2-3-4, D-city, C-prefecture | Feb. 2, 1990 | 080-1111-1111 |

Table 1 includes a "client ID" which is an identifier for uniquely identifying a client, "name", "address", "birth date", and "contact". The work information which is data necessary for generating the form is not limited only to the client information, but may include information about a stock and delivery of a product, and account information. Table 2 illustrates an example of the business form information.

TABLE 2

Form Information

| Form ID | Form Name | Form Template ID |
|---|---|---|
| form-001 | Plan Design Specification A | template-001 |
| form-002 | Plan Design Specification B | template-001 |

Table 2 includes "form ID" which is an identifier for uniquely identifying form information, "form name" for screen display, and "form template ID" which is an identifier for identifying a form template managed by the business form system 104.

The work server 103 receives a form preview instruction from the web browser 107 on the web screen I/F 351. The work information management unit 352 transmits, as a form generation request, client information and a form template ID of the business form information, to the business form system 104.

<Software Configuration and Management Information of Business Form System 104>

Referring to FIG. 3B, a system web server 300, a job management server 310, a form generation server 320, a conversion job server 330, a database (DB) 350, a form generation queue 341, and a conversion queue 342 which are included in the business form system 104 will be described. Various functions are stored in the HDD 204 and are loaded into the RAM 203 and executed by the CPU 201.

The job management server 310 includes an external I/F 311 and a job management unit 312. The form generation server 320 includes an external I/F 321, a form generation job management unit 322, and a form generation unit 323. The conversion job server 330 includes an external I/F 331, a conversion job management unit 332, and a conversion unit 333.

The system web server 300 provides various interfaces for the business form system 104, receives a request from the work server 103, and responds to the request. An example of the system web server 300 is a function implemented by software such as Apache. The same holds true for web servers (361, 371) to be described below.

The job management server 310 receives a request from the system web server 300, and transmits a request message to each of the form generation queue 341 and the conversion queue 342. In the processing described below, for convenience of description, a simple expression that "the job management server 310 receives a request from the work server 103" is used to indicate that the job management server 310 receives a request from the work server 103 through the system web server 300.

The job management server 310 receives response messages from the form generation server 320 and the conversion job server 330 through the form generation queue 341 and the conversion queue 342. In this case, upon reception of a response message indicating end of an error from the conversion queue 342, the job management server 310 transmits a data conversion request message again to the conversion queue 342 to perform re-execution (hereinafter referred to as retry).

The form generation server 320 acquires a form generation request message through the form generation queue 341, generates data, and transmits a PDF file and an overlay index file as the generated data to the storage server 106. The overlay index file is a file including information indicating an acquisition destination of a PDF file. The overlay index file will be described in detail below. The form generation server 320 transmits the data generation result as a response message to the form generation queue 341.

The conversion job server 330 acquires the data conversion request message through the conversion queue 342, and transmits a data conversion request to the data conversion server 105. The data conversion request message includes a conversion job ID. The conversion job server 330, which is disposed at a back end of the conversion queue 342, receives the data conversion request, and performs processing based on the data format specified by the conversion job ID as described in detail below. The data conversion request received as a response message from the data conversion server 105 is transmitted to the job management server 310 through the conversion queue 342.

The number of form generation servers 320 and conversion job servers 330 which perform processing by transmitting and receiving request/response messages through a queue is automatically increased or decreased (auto scaling) depending on a load. The present exemplary embodiment is described assuming that a form generation server 320 and a conversion job server 330 are singly provided.

The DB 350 is a database that stores form template information (Table 3), job information (Table 4), form generation job information (Table 5), and conversion job information (Table 6). Table 3 illustrates an example of the form template information.

TABLE 3

Form Template Information

| Form Template ID | Form Template URL |
|---|---|
| template-001 | https://storage.com/templates/template-001 |
| template-002 | https://storage.com/templates/template-002 |

The form template information is managed by the business form system 104 and is stored as a file in the storage server 106. As illustrated in Table 3, the form template information includes "form template URL", which is a URL for acquiring a form template, and a "form template ID".

Upon reception of a form generation request from the work server 103, the job management unit 312 of the job management server 310 instructs the form generation server 320 to generate a form based on the client information and the form template ID which are included in the request.

In the present exemplary embodiment, form information is preliminarily defined in form template data, and client information managed by the work server 103 is used as field data. The form generation unit 323 of the form generation server 320 accesses the form template URL included in the form template information and acquires the form template data from the storage server 106. Further, the form generation unit 323 acquires the form information from the form template data, overlays the acquired form information with the client information, and outputs PDF format data.

The job information stored in the DB 350 will be described with reference to Table 4. Table 4 illustrates an example of the job information which is managed by the job management unit 312 and is stored in the DB 350.

state is retried and the thumbnail conversion job ID is changed, so that the value of the "thumbnail conversion retry flag" is set to "TRUE".

The "initial display screen" is an item for determining whether the SVG format or the thumbnail format is initially displayed in a web form display on the web browser 107. Based on a received web form generation request, "svg" or "thumbnail" is set.

The job ID, the form generation job ID, and the conversion job ID illustrated in Table 4, are issued by the job management unit 312 of the job management server 310 when the form system 104 receives the web form generation request.

The value of the conversion retry flag is written when the job management unit 312 receives a conversion job error response from the conversion job server 330 through the conversion queue 342 and retries the conversion job. Even when the conversion job is retried, the job ID is not changed and the conversion job ID is re-created.

Next, referring to Table 5, the form generation job information will be described that is managed by the job management unit 312 and the form generation job management unit 322 and is stored in the DB 350.

TABLE 4

| | | | Job Information | | | |
|---|---|---|---|---|---|---|
| Job ID | Form Generation Job ID | SVG Conversion Job ID | SVG Conversion Retry Flag | Thumbnail Conversion Job ID | Thumbnail Conversion Retry Flag | Initial Display Screen |
| job-0001 | overlay-001 | conv-001 | FALSE | conv-011 | FALSE | svg |
| job-0002 | overlay-002 | conv-102 | TRUE | conv-012 | FALSE | thumbnail |

The job information is information indicating a state where web form data to be managed by the business form system 104 is generated. The job information includes a "job ID" for uniquely identifying a job, a "form generation job ID" for uniquely identifying a form generation job to be described below, an "SVG conversion job ID" for identifying a conversion job for converting data into an SVG format, and an "SVG conversion retry flag" for identifying whether an SVG conversion job has been retried. The value of "SVG conversion retry flag" is set to "TRUE" as a result of retrying the conversion job which is in an error state and changing the SVG conversion job ID.

The job information further includes a "thumbnail conversion job ID", a "thumbnail conversion retry flag", and an "initial display screen". The "thumbnail conversion job ID" is a conversion job ID for uniquely identifying a conversion job for converting data into a JPEG format. The "thumbnail conversion retry flag" is a flag for identifying whether the thumbnail conversion job has been retried. The conversion job for converting data into a JPEG format that is in an error

TABLE 5

| Form Generation Job Information | | |
|---|---|---|
| Form Generation Job ID | Form Generation Status | Form Template ID |
| overlay-001 | processing | template-001 |
| overlay-002 | success | template-002 |
| overlay-003 | error | template-001 |

The form generation job information is information indicating a generation processing status of business form data to be generated by the form generation server 320. Table 5 includes a "form generation job ID", a "form generation status" indicating an execution status of business form data generation processing, and a "form template ID".

Referring to Table 6, the conversion job information will be described that is managed by the job management unit 312 and the conversion job management unit 332 and is stored in the DB 350.

TABLE 6

| | | | Conversion Job Information | | | |
|---|---|---|---|---|---|---|
| Conversion Job ID | Conversion Status | Form at | Conversion Service Job ID | Overlay Index File URL | | Conversion Index File URL |
| conv-001 | processing | svg | convert-001 | https://storage.com/pdf/001/index.json | | https://storage.com/form/overlay-001/svg/index.json |

TABLE 6-continued

Conversion Job Information

| Conversion Job ID | Conversion Status | Format | Conversion Service Job ID | Overlay Index File URL | Conversion Index File URL |
|---|---|---|---|---|---|
| conv-002 | error | svg | convert-002 | https://storage.com/pdf/002/index.json | https://storage.com/form/overlay-002/svg/index.json |
| conv-011 | success | thumbnail | convert-003 | https://storage.com/pdf/001/index.json | https://storage.com/form/overlay-001/jpg/index.json |
| conv-012 | success | thumbnail | convert-004 | https://storage.com/pdf/002/index.json | https://storage.com/form/overlay-002/jpg/index.json |
| conv-102 | processing | svg | convert-005 | https://storage.com/pdf/002/index.json | https://storage.com/form/overlay-002/svg2/index.json |

The conversion job information is information indicating a status of SVG conversion processing or JPEG conversion processing (hereinafter referred to as conversion processing) performed by the data conversion server 105. Table 6 illustrates an example of the conversion job information about the SVG conversion job.

The conversion job information includes a "conversion job ID" for uniquely identifying a conversion job, a "conversion status" indicating a conversion processing status, a "format" which is a converted image format and is included in the conversion request from the business form system 104, and a "conversion service job ID" which is issued by the data conversion server 105.

The conversion job information further includes an "overlay index file URL", which is a URL for accessing an index file of PDF format data, and a "conversion index file URL" which is a URL for accessing a conversion index file generated when the data conversion server 105 starts the conversion processing.

<Software Configuration and Management Information of Data Conversion Server 105>

The data conversion server 105 includes a data conversion web server 361, a conversion information management unit 362, a data conversion unit 363, and a data conversion storage unit 364.

The data conversion web server 361 provides various interfaces of the data conversion server 105, receives a data conversion request from the business form system 104, and responds to the request. The data conversion storage unit 364 stores conversion information.

Referring to Table 7, the conversion information included in the data conversion server 105 will be described. The conversion information is managed by the conversion information management unit 362 and is held in the data conversion storage unit 364.

TABLE 7

Conversion Information

| Conversion Service Job ID | Overlay Index File URL | Format | Conversion Index File URL |
|---|---|---|---|
| convert-001 | https://storage.com/form/overlay-111/pdf/index.json | svg | https://storage.com/form/overlay-001/svg/index.json |
| convert-002 | https://storage.com/form/overlay-234/pdf/index.json | svg | https://storage.com/form/overlay-002/svg/index.json |
| convert-003 | https://storage.com/form/overlay-111/pdf/index.json | thumbnail | https://storage.com/form/overlay-001/jpg/index.json |
| convert-004 | https://storage.com/form/overlay-234/pdf/index.json | thumbnail | https://storage.com/form/overlay-002/jpg/index.json |
| convert-005 | https://storage.com/form/overlay-234/pdf/index.json | svg | https://storage.com/form/overlay-002/svg2/index.json |

The "conversion service job ID" included in the conversion information is an identifier uniquely identifying conversion processing which is issued by the conversion information management unit 362 when the data conversion web server 361 receives a conversion request from the business form system 104. The data conversion server 105 receives the "overlay index file URL" together with the conversion request from the conversion job server 330. The "format" is a file format obtained after the conversion processing. The conversion unit 333 includes the "format" in the conversion request made to the data conversion server 105.

The "conversion index file URL" is generated when the data conversion unit 363 starts the conversion processing. The data conversion unit 363 periodically acquires and refers to the overlay index file, thereby acquiring target data to be subjected to the conversion processing. After the target data is converted, conversion index file URL update processing is performed.

<Software Configuration and Management Information of Storage Server 106>

The storage server 106 will be described with reference to FIG. 3D. The storage server 106 includes a storage web server 371, a file information management unit 372, and a storage unit 373. The storage web server 371 provides various interfaces of the storage server 106. The file information management unit 372 manages the file information, and inputs or outputs a file in response to a request received by the storage web server 371. The storage unit 373 stores the file information and the file received by the storage server 106. In this case, the file includes the conversion index file and the overlay index file.

Referring to Table 8, the file information included in the storage server 106 will be described. The file information is managed by the file information management unit 372. Table 8 illustrates an example of the file information about the overlay index file.

TABLE 8

File Information

| Data URL | File Path |
| --- | --- |
| https://storage.com/form/overlay-111/pdf/index.json | /form/overlay-111/pdf/index.json |
| https://storage.com/form/overlay-234/pdf/index.json | /form/overlay-234/pdf/index.json |
| https://storage.com/form/overlay-111/pdf/index.json | /form/overlay-111/svg/index.json |
| https://storage.com/form/overlay-234/pdf/index.json | /form/overlay-234/svg/index.json |
| https://storage.com/form/overlay-234/pdf/index.json | /form/overlay-234/thumbnail/index.json |

A "data URL included in the file information is a URL for uniquely identifying a file, and a "file path" indicates a storage location of a file. The storage web server 371 receives a request for the data URL, and the file information management unit 372 updates the file information and performs a file operation within the storage unit 373.

As the file operation, for example, when a request for HTTP GET method with respect to the data URL is received from the client 102, the file corresponding to the data URL is downloaded. In a case where a request for HTTP PUT method is received together with the file from the client 102, the file is uploaded and stored. In the case where a request for HTTP DELETE method is received, the file corresponding to the data URL is deleted.

<Index File>

FIG. 4 illustrates an example of the index file. The present exemplary embodiment is described assuming that a JavaScript Object Nation (JSON) file format is used as the index file. However, the file format is not limited to the JSON file format. FIG. 4 illustrates the overlay index file as an example of the index file.

An index file 400 is generated or updated when the business form system 104 executes overlay output processing, or when the data conversion server 105 executes conversion processing. Specifically, the index file is generated in the storage server 106 at the time when an overlay conversion performed by the form generation server 320 of the business form system 104 and SVG conversion processing and thumbnail conversion processing performed by the data conversion server 105 are started. The index file 400 includes a data URL list obtained as a result of the processing using "dataList" as a key, and a processing completion flag using "end" as a key.

In a case where data obtained as a result of overlay output processing is a PDF file, the PDF file is output per page. In this case, three PDF files are output for a three-page form. However, the file need not necessarily be output per page. A fixed number of pages, a value calculated from the number of entire pages, or the like may be set as a unit for outputting the file. The conversion processing performed by the conversion server 105 is also executed per unit of PDF file which is obtained as a result of overlay output processing.

The business form system 104 or the data conversion server 105 sequentially executes the processing, uploads the file acquired as a result of executing the processing, to the storage server 106, and adds an URL, which is information indicating the acquiring destination of the data, to "dataList" in the index file 400. For example, in a case where the data conversion server 105 executes conversion processing, URLs for an SVG file and a JPEG file are added to "dataList" in the index file 400 according to a conversion format.

At the time when the processing is completed in the business form system 104 or the data conversion server 105 and the file which is obtained as a result of the processing and includes a last page is uploaded to the storage server 106, the value of the processing completed flag "end" in the index file is set to "TRUE". The index file has been described above.

While the overlay index file is illustrated in the above description as an example in the present exemplary embodiment, the same file structure can also be applied to the conversion index file. The overlay index file is used to acquire a PDF file (an output result of the business form system 104), and the conversion index file is used to acquire web business form data (an output result of the data conversion server 150) which is obtained as a result of performing an SVG conversion or a JPEG conversion.

<Web Form Data Generation Retry Sequence>

Figure 5B:
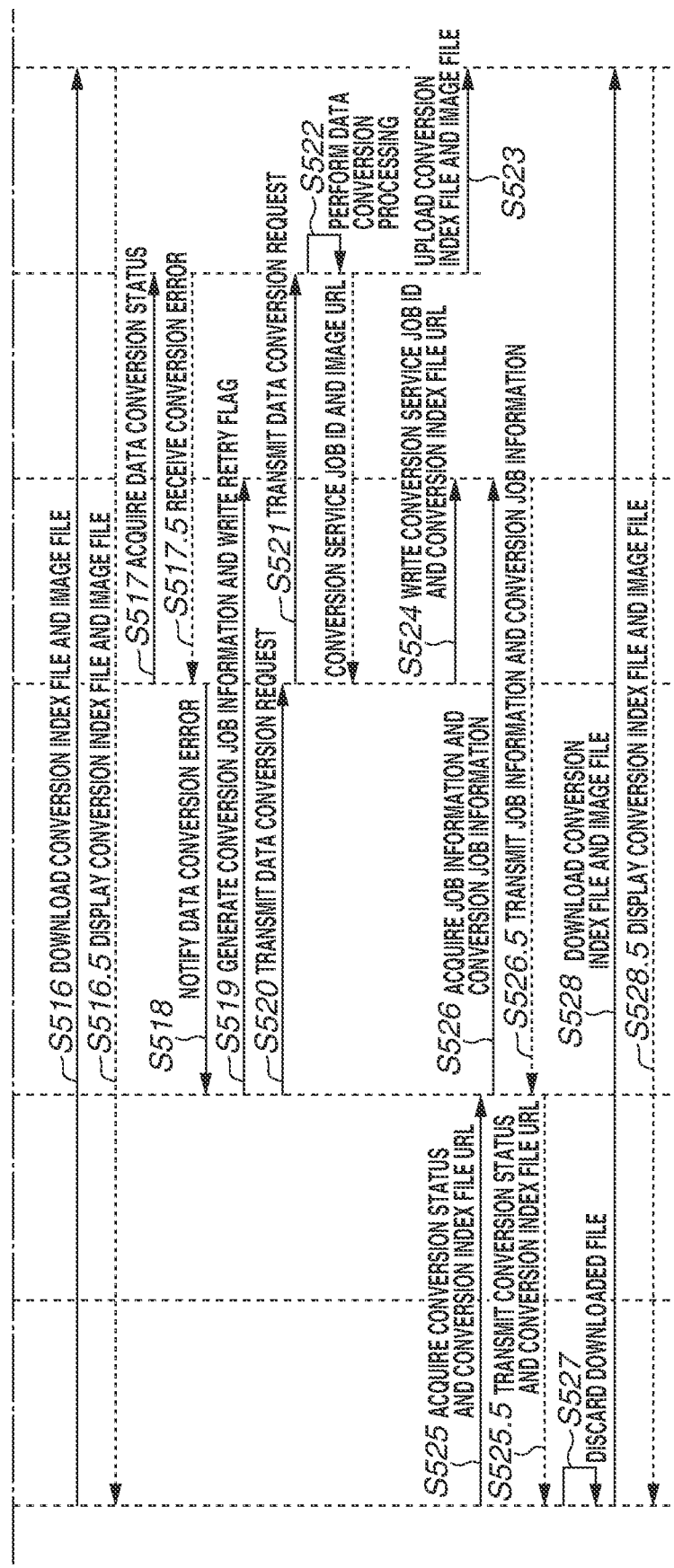
FIG. 5 (including FIG. 5A and FIG. 5B) is a sequence diagram for a retry of web form data generation according to a first exemplary embodiment.

Referring to FIG. 5, processing for retrying conversion processing and displaying image data obtained after execution of retry processing on the web browser 107 will be described, in a case where an error has occurred in the conversion processing performed by the form generation server 320 will be described. In the present exemplary embodiment, form data in SVG format or JPEG format is referred to as an image.

First, in step S501, the web form generation request is transmitted from the web browser 107 to the work server 103. In this case, the processing is executed when the web browser 107 receives the web form generation request made by a user operation through a screen (not illustrated).

In step S502, the work information management unit 352 of the work server 103 transmits, to the job management server 310, client information (a client ID and a form ID), a form template ID, and an initial display screen, which are included in the web form generation request, as a web form job generation request.

The job management unit 312 of the job management server 310 issues a job ID, a form generation job ID, an SVG conversion job ID, and a thumbnail conversion job ID. In step S503, the issued IDs are stored in the DB 350 as the job information (Table 4), the form generation job information (Table 5), and the conversion job information (Table 6).

Specifically, as the conversion job information, the "format" for SVG conversion processing is stored as "svg" and the "format" for JPEG conversion processing is stored as "thumbnail" in the DB 350 as different conversion job information. On the other hand, the job information includes the generated "form generation job ID", "SVG conversion job ID", and "thumbnail conversion job ID", and the "initial display screen", "SVG conversion retry flag", and "thumbnail conversion retry flag" which are included in the web form generation request. Since retry processing is not executed yet, the values of the SVG conversion retry flag and the thumbnail conversion retry flag are each set to "FALSE".

The form generation job information includes the form template ID which is received together with the web form generation request.

In step S504, the job management unit 312 of the job management server 310 transmits a form generation request to the form generation server 320. Specifically, the job management server 310 transmits a form generation request message including the form generation job ID and the client information to the external I/F 321.

When the form generation job management unit 322 acquires the form generation request message from the external I/F 321, in step S505, the form generation job management unit 322 identifies the form template ID from the received form generation job ID and downloads the form template file from the storage server 106. The form generation unit 323 performs overlay processing using the client information and the form template file, and generates PDF format data. In step S506, the generated PDF files are sequentially uploaded to the storage server 106.

The conversion queue 342 stores the data conversion request message including the SVG conversion job ID, and the data conversion request message including the thumbnail conversion job ID. Different conversion job servers 330 acquire the request messages, respectively, thereby executing SVG conversion processing and JPEG conversion processing in parallel. The processing of step S507 and subsequent steps to be executed in the JPEG conversion processing is similar to SVG conversion processing. Accordingly, a part of the descriptions thereof is omitted and only the conversion processing for converting data into an SVG format is described.

In step S507, the job management unit 312 of the job management server 310 transmits, to the conversion unit 333 of the conversion job server 330, the data conversion request for converting the data generated in step S505 into an SVG format, without waiting for the completion of the processing of steps S505 and S506. Specifically, the data conversion request message including the SVG conversion job ID is transmitted to the external I/F 331 through the conversion queue 342. When the conversion job management unit 332 acquires the data conversion request message from the external I/F 331, the conversion job management unit 332 acquires, from the DB 350, the overlay index file URL associated with the SVG conversion job ID.

After the processing of step S507 is executed, the job management server 310 transmits, to the work server 103, a response including the job ID and the web form URL as a response to step S502. In step S502.5, the work server 103 which has received the response transmits the response to the web browser 107.

In step S508, the conversion unit 333 transmits the data conversion request including the overlay index file URL to the data conversion server 105. Upon reception of the data conversion request, the data conversion server 105 issues the conversion service job ID and creates the conversion information (Table 7) associated with the conversion service job ID. Since the SVG conversion processing is illustrated in the present exemplary embodiment, a value "svg" is set to the "format" in the conversion information generated in the processing of step S508.

In step S509, the data conversion unit 363 of the data conversion server 105 executes the SVG conversion processing, and in step S508.5, the data conversion unit 363 transmits, to the conversion job server 330, the conversion service job ID and the conversion index file URL as a response.

Every time the SVG conversion processing is executed, in step S510, the data conversion unit 363 of the data conversion server 105 sequentially updates the image file in SVG format and the conversion index file to the storage server 106. In step S511, the conversion unit 333 updates the conversion service job ID included in the conversion job information in the DB 350 based on the value received in the response obtained in step S508 and stores the updated conversion service job ID.

In step S513.5, the web browser 107 accesses the web form URL received as a response to the web form generation request, and acquires HTML and JavaScript® for displaying a web form. After that, the web browser 107 executes processing using the acquired JavaScript. In step S514, the web browser 107 transmits, to the job management server 310, a request for acquiring the conversion status and conversion index file URL together with the job ID included in the web form URL.

The job management unit 312 of the job management server 310 acquires the conversion retry flag and the SVG conversion job ID from the job information in the DB 350, and acquires the conversion status and the conversion index file URL included in the conversion job information from the acquired SVG conversion job ID. In steps S515 to S515.5, the job management unit 312 transmits, to the web browser 107, the response information including the conversion status and the conversion index file URL. In this case, an initial display screen setting value included in the job information is also transmitted to the web browser 107 from the DB 350 through the job management server 310. In the present exemplary embodiment, assume that the initial display screen setting value "svg" is transmitted to the web browser 107.

FIG. 6 illustrates an example of response information 600 that is received by the web browser 107 in step S515.5 and step S525 to be described below. The response information includes the status of SVG conversion processing and the status of thumbnail conversion processing. Specifically, the response information includes a job ID "jobId" for identifying job information, an initial display screen setting "initialView", a conversion status "status", a conversion index file URL "indexUrl", information "svg" about a data conversion job for converting data into an SVG format, and information "thumbnail" about a job for converting data into a thumbnail format. The example illustrated in FIG. 6 indicates that the creation of thumbnail format data is complete (SUCCESS) and SVG format data is being created (PROCESSING). When the data is updated in the data conversion processing by retry processing to be described below, a value "RETRY" is set as "status". An example of the response information 600 has been described above.

Referring again to FIG. 5, in step S516, the web browser 107 accesses the conversion index file URL included in the acquired response information, and then acquires the conversion index file. In this case, the web browser 107 acquires the conversion index file for displaying the business form data in SVG format based on the initial display screen setting value "svg" received in step S515.5. In this manner, before acquiring the conversion index file, the web browser 107 acquires the initial display screen setting value included in the job information (Table 4) and checks the format of business form data to be acquired.

Further, in step S516.5, the web browser 107 downloads the image file from the URL for the image file included in the conversion index file, and displays the image data on the web browser 107 based on the image file. Since the SVG conversion processing is illustrated in the present exemplary embodiment, the image to be displayed on the web browser 107 based on the image file is an SVG format image.

The processing for acquiring the response information in step S514 is repeated until both the conversion statuses of SVG conversion processing and thumbnail conversion processing indicate a conversion end ("success") or an error ("error"). The processing of step S516 is repeated until the value of the processing complete flag "end" in the conversion index file indicates "TRUE".

In step S517, the conversion unit 333 transmits, to the data conversion server 105, a data conversion status acquisition request including the conversion service job ID, and acquires a conversion processing status. If the status indicating that the conversion processing is being performed is received from the data conversion server 105 in step S517, the processing of step S517 is repeated again after a lapse of a certain period. The conversion processing status can be recognized by this processing.

If an error has occurred in the SVG conversion processing of step S509, in step S517.5, the conversion unit 333 receives a data conversion error in step S517. The conversion job management unit 332 receives the data conversion error, and updates the conversion status in the conversion job information with "error". In step S518, the external I/F 331 transmits, to the job management server 310, a data conversion error notification together with the job ID. Specifically, a response message is transmitted to the conversion queue 342, and the job management server 310 acquires the response message.

In step S519, the job management unit 312 of the job management server 310 issues a new SVG conversion job ID (a second SVG conversion job ID), and stores the conversion job information in the DB 350. Further, the job management unit 312 updates the SVG conversion job ID, which is included in the job information (Table 4) specified by the job ID received in the response message, with the second SVG conversion job ID. The job management unit 312 updates the value of the conversion retry flag with "TRUE", and stores the updated value in the DB 350. Specifically, a conversion job different from the conversion job in which the conversion status is updated with "error" in step S518 is issued by the processing of step S519.

In step S520, the external I/F 311 of the job management server 310 transmits, to the conversion unit 333, the data conversion request including the second SVG conversion job ID. In practice, the data conversion request message is transmitted to the conversion queue 342, and the external I/F 331 of the conversion job server 330 acquires the request message. The SVG conversion processing and conversion index file URL update processing in steps S521 to S524 are similar to the processing of steps S508 to S511. The upload processing and conversion index file storage processing in the storage server 106 in step S525 are similar to the processing of step S514.

The conversion service job ID and conversion index URL issued in steps S521 to S524 are different from those issued in steps S508 to S511. Specifically, retry processing is executed to issue a new conversion job, so that the job in steps S521 to S524 is treated as a job different from the job in steps S508 to S511.

In steps S526 to S526.5, the job management unit 312 of the job management server 310 acquires an SVG conversion retry flag and a new conversion job ID from the job information (Table 4) in the DB 350, and acquires the conversion status and a new conversion index file URL in the conversion job information (Table 6) from the SVG conversion job ID. In step S525.5, the job management unit 312 of the job management server 310 transmits the acquired conversion status and conversion index file URL to the web browser 107. In this case, the SVG conversion retry flag acquired from the job information indicates "TRUE".

Accordingly, the job management unit 312 transmits, to the web browser 107, the conversion status "status" included in the response information as "RETRY". FIG. 6 illustrates an example of the response information.

Since the SVG conversion job ID in the job information is updated with the second SVG conversion job ID in step S519, a URL to be transmitted to the web browser 107 as the conversion index file URL "indexUrl" included in the response information is the URL associated with the second SVG conversion job ID.

Upon reception of the conversion status "RETRY", in step S525, the web browser 107 determines that a data conversion retry has occurred. In step S527, the web browser 107 discards the received conversion index file and image file and brings the display of the screen file into a non-display state. In step S528, the web browser 107 accesses the conversion index file URL included in the response information, and in step S528.5, the web browser 107 acquires the conversion index file obtained after execution of retry processing and the image file in SVG format, and executes the screen display.

FIG. 8 illustrates an example of the display screen on the web browser 107 in the processing of steps S527 to 528.5. A display screen 801 displays an SVG format image generated by the SVG conversion processing of step S509 before execution of retry processing. The display screen 801 is displayed during a period from a time when the web browser 107 acquires the SVG format image data in step S516.5 until a time when the image data is brought into the non-display state in step S527. In step S527, the display screen 801 is brought into the non-display state and a display screen 802 is displayed. A display screen 803 is the same screen as the display screen 801 as an example of the screen to be displayed after the retry processing (step S522) in the SVG conversion processing. The display screen is switched from the display screen 802 to the display screen 803 by the processing of step S528.5. The display mode of the display screen 802 is not limited to the example illustrated in FIG. 8.

The processing for displaying the image data obtained after execution of retry processing on the web browser in a case where an error has occurred during the web form data generation processing has been described above. According to the present exemplary embodiment, even in the system in which a plurality of conversion processes is executed asynchronously and in parallel, the retry processing and the image file re-acquisition processing can be executed by the web browser 107 in a case where an error has occurred in the processing.

A second exemplary embodiment will be described below. In the processing described in the first exemplary embodiment, the conversion processing is retried so that the web browser 107 executes image file re-acquisition and re-display processing from the second conversion index file URL to discard or re-render the image being displayed. In this case, as illustrated in FIG. 8 according to the first exemplary embodiment, for example, if the image displayed on the initial display screen and the image to be subjected to retry processing at the back end are in the same SVG format, the image being displayed is suddenly brought into a non-display state (display screen 802) as viewed from a user. If a new image is displayed on the screen after the image being displayed is suddenly brought into the non-display state, the user cannot determine whether the image is an updated image. This causes a deterioration in the usability of the web form display.

In the present exemplary embodiment, a business form system that retries conversion processing while maintaining the usability will be described. The description of the content which has already been described in the first exemplary embodiment is omitted.

Figure 7:
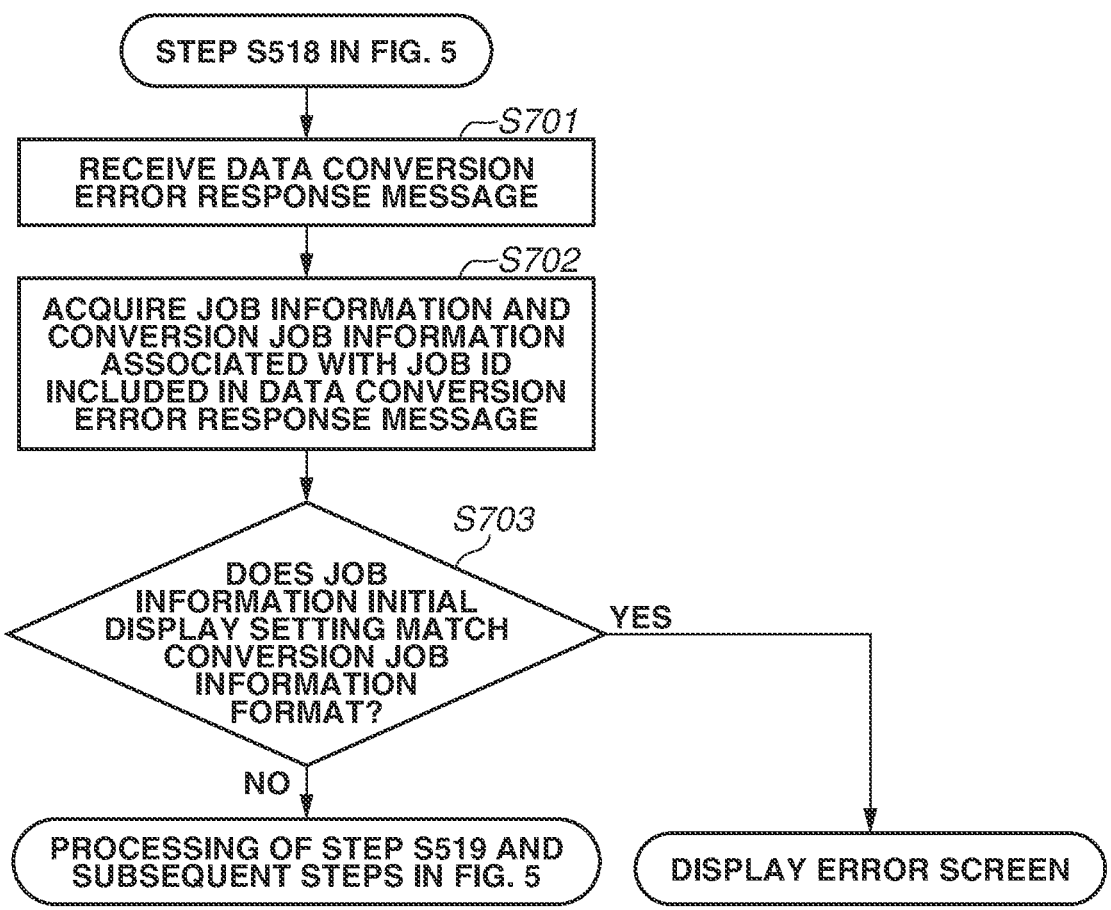
FIG. 7 is a flowchart illustrating processing to be executed before conversion processing is retried according to a second exemplary embodiment.

FIG. 7 is a flowchart illustrating data conversion error notification processing according to the second exemplary embodiment. This processing flow corresponds to the processing of step S518 according to the first exemplary embodiment. In step S701, the job management server 310 receives a data conversion error response message. In step S702, the job management server 310 acquires, from the DB 350, job information and conversion job information which are associated with the job ID included in the data conversion error response message.

In step S703, the job management unit 312 of the job management server 310 determines whether the initial display setting in the job information matches the format of the conversion job information. In the processing of step S703, the job management unit 312 determines whether the format displayed on the web browser 107 matches the format of image data to be re-displayed by retry processing.

If it is determined that the initial display setting does not match the format in step S703 (NO in step S703), it is determined that the execution of re-display by retry processing does not affect browsing of the screen by the user. Accordingly, the processing of step S519 and subsequent steps is executed to retry the conversion job. The processing of step S519 and subsequent steps has been described above, and thus the description thereof is omitted.

If it is determined that the initial display setting matches the format in step S703 (YES in step S703), it is determined that the execution of re-display by retry processing affects browsing of the screen by the user. Accordingly, the web form generation processing is terminated without performing the retry processing. Specifically, an error screen is received as a response in step S525 and is displayed and the conversion processing is interrupted, without retrying the SVG conversion processing in the processing of step S519 and subsequent steps. FIG. 9 illustrates an example of the error screen displayed in this case. FIG. 9 illustrates a message indicating that an error has occurred, an error code, and the date and time when the error has occurred. The error screen in FIG. 9 is illustrated by way of example only. A configuration for prompting the user to re-transmit the web form generation request to the business form system 104 may be employed.

The data conversion error notification processing according to the second exemplary embodiment has been described above. According to the second exemplary embodiment, it is possible to retry the conversion processing while maintaining the usability.

Other Embodiments

The configuration of the business form system 104 according to the exemplary embodiments is not limited to the above-described configuration. For example, the form generation server 320 and the conversion server 105 may be configured using the same server.

The exemplary embodiments described above illustrate a configuration in which an image file is re-acquired when the client 102 acquires the conversion status "RETRY" from the business form system 104 in step S525. However, the present invention is not limited to this configuration. A configuration may be employed in which the conversion index file already acquired by the client 102 is compared with a newly acquired conversion index file, and an image file is re-acquired if the conversion index files are different.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-238087, filed Dec. 12, 2017, which is hereby incorporated by reference herein in its entirety.

What is claimed is:

1. An information processing system comprising:
a service system comprising:
one or more processors; and one or more memories storing instructions that, when executed by the one or more processors, cause the service system to perform operations comprising:
performing conversion processing, a first time, to sequentially generate first business form data based on data;
generating first image data based on the first business form data generated by performing the conversion processing on the data the first time;
creating a first conversion index file including information about an acquisition destination of the generated first image data;
executing the conversion processing on the data, a second time, to sequentially generate second business form data based on the data, in order to create a second conversion index file, in a case where it is determined that an error has occurred in performing the conversion processing on the data the first time; and
transmitting, to a client web browser configured to display image data, information about an acquisition destination of the second conversion index file; and
a client computer comprising: a display; one or more processors; and one or more memories storing instructions that, when executed by the one or more processors, cause the client computer to perform operations comprising:

displaying, on the display, the first image data based on the first conversion index file;

acquiring second image data based on the information about the acquisition destination of the second conversion index file, the second image data generated based on the second business form data; and displaying the acquired second image data.

2. The information processing system according to claim 1, wherein the operations performed by the client computer further comprise:

acquiring the information about the acquisition destination of the second conversion index file, and then performing non-display processing on the first image data displayed on the display and displaying the second image data.

3. The information processing system according to claim 2, wherein the operations performed by the service system further comprise:

transmitting, to the client web browser, the information about the acquisition destination of the second conversion index file, as well as a conversion status indicating that the conversion processing has been retried, wherein the non-display processing is processing in which, after the client web browser determines that the conversion status indicates that the conversion processing has been retried, the first conversion index file and the first image data displayed based on the first conversion index file are discarded and the first image data is brought into a non-display state.

4. The information processing system according to claim 1, wherein the operation of acquiring second image data based on the information about the acquisition destination of the second conversion index file, performed by the client computer is performed by acquiring the second image data from an acquisition destination specified by information about the acquisition destination of the second image data included in the second conversion index file, and displaying the acquired second image data.

5. The information processing system according to claim 1, wherein the operations performed by the service system further comprise determining whether a format of the first image data displayed on the display matches a format of the second image data displayed on the display in a case where it is determined that an error has occurred in performing the conversion processing on the data the first time, wherein in a case where it is determined that the formats of the displayed first image data and the format of the displayed second image data do not match, the service systems performs an operation to re-create the second conversion index file.

6. The information processing system according to claim 5, wherein in a case where it is determined that the formats match, processing for displaying the second image data is interrupted.

7. The information processing system according to claim 5, wherein the format is either a Scalable Vector Graphics (SVG) format or a Joint Photographic Experts Group (JPEG) format.

8. The information processing system according to claim 1, wherein the business form data is generated by converting Portable Document Format (PDF) data into an SVG format or a JPEG format, and the conversion processing is processing for converting the data into an SVG format or processing for converting the data into a JPEG format.

9. A non-transitory computer readable storage medium storing instructions that, when executed by one or more processors, cause the one or more processors to operate as an information processing system comprising: a service system that performs operations comprising: performing conversion processing, a first time, to sequentially generate first business form data based on data;

generating first image data based on the first business form data generated by performing the conversion processing on the data the first time;

creating a first conversion index file including information about an acquisition destination of the generated first image data; executing the conversion processing on the data, a second time, to sequentially generate second business form data based on the data, in order to create a second conversion index file, in a case where it is determined that an error has occurred in performing the conversion processing on the data the first time; and transmitting, to a client web browser configured to display image data, information about an acquisition destination of the second conversion index file; and a client computer that performs operations comprising: displaying on a display the first image data based on the first conversion index file; acquiring second image data based on the information about the acquisition destination of the second conversion index file, the second image data generated based on the second business form data; and displaying the acquired second image data.

10. A control method for an information processing system including a service system and a client computer, the method comprising:

at the service system:

performing, at a computing device, conversion processing, a first time, to sequentially generate first business form data based on data;

generating first image data based on the first business form data generated by performing the conversion processing on the data the first time;

creating a first conversion index file including information about an acquisition destination of the generated first image data;

executing the conversion processing on the data, a second time, to sequentially generate second business form data based on the data, in order to create a second conversion index file in a case where it is determined that an error has occurred in performing the conversion processing on the data the first time; and transmitting, to a client web browser configured to display image data, information about an acquisition destination of the second conversion index file; and at the client computer:

displaying, on a display, the first image data based on the first conversion index file:

acquiring second image data based on the information about the acquisition destination of the second conversion index file, the second image data generated based on the second business form data; and displaying the acquired second image data.

* * * * *